United States Patent
LaBarge

(10) Patent No.: US 7,399,728 B2
(45) Date of Patent: Jul. 15, 2008

(54) CATALYST FORMULATION, EXHAUST SYSTEM, AND GAS TREATMENT DEVICE

(75) Inventor: William J. LaBarge, Bay City, MI (US)

(73) Assignee: Umicore AG & Co KG, Hanau (DE)

( * ) Notice: Subject to any disclaimer, the term of this patent is extended or adjusted under 35 U.S.C. 154(b) by 540 days.

(21) Appl. No.: 10/742,467

(22) Filed: Dec. 19, 2003

(65) Prior Publication Data

US 2005/0137079 A1 Jun. 23, 2005

(51) Int. Cl.
*B01J 23/00* (2006.01)
*B01J 23/56* (2006.01)
*B01J 21/04* (2006.01)
*B01J 23/02* (2006.01)
*B01D 50/00* (2006.01)
*B01D 53/34* (2006.01)
*B21D 51/16* (2006.01)

(52) U.S. Cl. .............. 502/325; 502/305; 502/302; 502/308; 502/332; 502/349; 502/350; 502/439; 422/177; 422/180; 29/890

(58) Field of Classification Search ......... 502/305–355, 502/439; 422/177, 180; 29/890
See application file for complete search history.

(56) References Cited

U.S. PATENT DOCUMENTS

| | | | | |
|---|---|---|---|---|
| 5,430,230 A | * | 7/1995 | Mitsui et al. ............... | 588/320 |
| 5,830,822 A | * | 11/1998 | Euzen ......................... | 502/355 |
| 5,849,659 A | * | 12/1998 | Tanaka et al. ............... | 502/324 |
| 5,948,377 A | * | 9/1999 | Sung ........................ | 423/213.5 |
| 6,248,688 B1 | * | 6/2001 | Wu et al. .................... | 502/302 |
| 6,254,842 B1 | * | 7/2001 | Hu et al. .................. | 423/213.5 |
| 6,348,430 B1 | * | 2/2002 | Lindner et al. ............. | 502/304 |
| 6,407,032 B1 | * | 6/2002 | Labarge et al. ............. | 502/349 |
| 6,497,851 B1 | * | 12/2002 | Hu et al. .................. | 423/213.5 |
| 6,692,551 B2 | * | 2/2004 | Wernholm et al. ........... | 95/146 |
| 6,774,080 B2 | * | 8/2004 | LaBarge et al. ............ | 502/170 |
| 6,855,661 B2 | * | 2/2005 | Kim .......................... | 502/219 |
| 7,094,730 B2 | * | 8/2006 | LaBarge et al. ............ | 502/332 |
| 7,198,764 B2 | * | 4/2007 | Fisher et al. ........... | 422/186.04 |
| 2004/0173450 A1 | * | 9/2004 | Fisher et al. ................ | 204/164 |

* cited by examiner

*Primary Examiner*—J. A. Lorengo
*Assistant Examiner*—Patricia L Hailey
(74) *Attorney, Agent, or Firm*—Robert G. Weilacher; Smith, Gambrell & Russell

(57) ABSTRACT

In one embodiment, a catalyst formulation includes a poison adsorbing material and a catalyst material. The poison adsorbing material comprises large particles having an average major diameter of greater than or equal to about 2.0 micrometers. The catalyst material comprises a precious metal support comprising small particles having an average major diameter of less than or equal to about 1.0 micrometers, and a catalyst material comprising at least one of ruthenium and iridium.

37 Claims, No Drawings

CATALYST FORMULATION, EXHAUST SYSTEM, AND GAS TREATMENT DEVICE

TECHNICAL FIELD

The present disclosure relates to a catalyst formulation, exhaust system, and a gas treatment device.

BACKGROUND OF THE INVENTION

Conventional combustion conducted in the presence of a flame, which is usually employed in processes for the combustion of hydrocarbons such as methane, is a procedure that is difficult to control. It occurs in a well-defined range of air/hydrocarbon concentrations and, besides the formation of carbon dioxide and water, it results in the production of pollutants such as carbon monoxide and nitrogen oxides. Catalytic combustion produces few pollutants such as nitrogen oxides ($NO_X$) and carbon monoxide (CO). The introduction of a catalyst permits better control of total oxidation in a wide range of values in respect of the air/hydrocarbon ratio. With a catalyst, the air/hydrocarbon ratio can be outside the limits of inflammability of conventional combustion.

The common causes for catalyst failure include thermal degradation, catalyst poisoning, substrate failure, and plugging, with the two most important modes being thermal degradation and catalyst poisoning. Catalysts are preferably located as close to the exhaust manifold as possible, for fastest activity. However, catalysts located closest to the exhaust manifold are the least durable because they are the most thermally degraded and heavily poisoned. Thermal degradation, e.g., encapsulation and vaporization of the supports(s) and precious metal(s), can be improved with engine controls and more thermally stable materials. Substrate failure and plugging can be reduced with more costly mat material.

Catalyst poisoning, however, cannot be reduced with improved engine controls or more thermally stable materials. Poisons derive from the use of engine oil additives (e.g., zinc, phosphorus, barium, calcium, sodium, and magnesium), deposits of wear metals (e.g., iron, chromium, copper, lead, tin, and silver), and deposits from anti-freeze additives (e.g., silicon, boron, and the like). No matter how well developed the catalyst materials are, these poisons can deposit upon and restrict diffusion to the active metals. As durability requirements increase, emission failures due to poisoning becomes the most encountered failure mode. Further, deactivation is complicated by the fact that not all poisons are equally damaging. Significant amounts of deposits can exist on a catalyst with only marginal catalyst deactivation, e.g., iron and carbon deposits, while small amounts of certain other deposits can result in significant deactivation. For example, contaminants such as zinc, calcium, magnesium, and phosphorus (in forms such as, for example, zinc phosphate or calcium phosphate), and the like, quickly poison or otherwise damage the catalyst.

With increasing durability requirements, there remains a need for improved catalyst protective coatings, and methods for producing the catalyst that reduces poisoning of the precious metals.

Another problem in the formation of a catalyst lies in the overall efficiency of the active phase of the catalyst. Active phases that have a high efficiency for oxidation of hydrocarbons to carbon dioxide and water tend to be less efficient in the downstream reduction of the NOx. Active phases that are less efficient, e.g., those that partially oxidize hydrocarbons to $H_2$, CO, and HCO, tend to be more efficient in the downstream reduction of NOx.

SUMMARY OF THE INVENTION

Disclosed herein are catalysts, methods for making catalysts, exhaust systems, and gas treatment devices. In one embodiment, a catalyst formulation includes a poison adsorbing material and a catalyst material. The poison adsorbing material comprises large particles having an average major diameter of greater than or equal to about 2.0 micrometers. The catalyst material comprises a precious metal support comprising small particles having an average major diameter of less than or equal to about 1.0 micrometers, and a catalyst material comprising at least one of ruthenium and iridium.

In one embodiment, a gas treatment device comprises: a shell, a coated substrate disposed within the shell, and a retention material disposed between the shell and the substrate. The coating comprises a calcined product of a poison adsorbing material and a catalyst material. The poison adsorbing material comprises large particles having an average major diameter of greater than or equal to about 2.0 micrometers. The catalyst material comprises a precious metal support comprising small particles having an average major diameter of less than or equal to about 1.0 micrometers, and a catalyst material comprising at least one of ruthenium and iridium.

In one embodiment, the exhaust system comprises a gas treatment device located in a close-coupled or a manifold position. The gas treatment device comprises a shell, a coated substrate disposed within the shell, and a retention material disposed between the shell and the substrate. The coating comprises the calcined product of a poison adsorbing material comprising large particles having an average major diameter of greater than or equal to about 2.0 micrometers and a catalyst material comprising a precious metal support comprising small particles having an average major diameter of less than or equal to about 1.0 micrometers, and a catalyst material comprising at least one of ruthenium and iridium.

The above described and other features are exemplified by the following figures and detailed description.

DESCRIPTION OF THE PREFERRED EMBODIMENT

Poisoning and damage to the precious metals can be prevented with a high surface area poison adsorbing material. Poison adsorbing materials can comprise metal oxides that have a large particle size (e.g., an average particle size (measured along the major diameter) of greater than or equal to about 2 micrometers) and a high surface area (e.g., stabilized aluminum oxides, titanium oxides, zirconium oxides, zeolites, etc.), where the preferred poison adsorbing materials react with the contaminants. For example, high surface area lanthanum stabilized aluminum oxide is very reactive towards zinc, calcium, magnesium, and phosphorus; i.e., poisons. Poison adsorption on high surface area lanthanum stabilized aluminum oxide causes no catalyst deactivation since the precious metal(s) are not contained on this aluminum oxide. The exhaust gasses of concern, e.g., hydrocarbons (HC), CO, and NOx, however, are only reactive with precious metals. Exhaust gasses such as HC, CO, and NOx easily pass through the poison adsorbing material to the active precious metal phase.

Increased catalyst durability can be attained by inhibiting catalyst contamination from contaminants such as combusted engine oil additives, wear metals, and anti-freeze additives. Therefore, a protective component, i.e., the poison adsorbing material, is included in a catalyst formulation, e.g., preferably surrounding the precious metal and precious metal support.

Formation of the catalyst formulation can comprise forming a catalyst slurry comprising a precious metal on a precious metal support oxide (e.g., ruthenium on zirconium oxide, or the like) and at least a high surface area support metal (e.g., lanthanum stabilized aluminum oxide, or the like). This catalyst formulation can be coated, e.g., slip cast, onto a substrate.

The substrate can comprise any material designed for use in a spark ignition or diesel engine environment and having the following characteristics: (1) capable of operating at temperatures up to about 600° C., and up to about 1,200° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot, and the like), carbon dioxide, and/or sulfur; and (3) having sufficient surface area and structural integrity to support a catalyst, if desired. Some possible substrate materials include cordierite, silicon carbide, metal, metal oxides (e.g., aluminum oxide, and the like), and mixtures comprising at least one of the foregoing materials. These materials can be in the form of foils, perform, mat, fibrous material, monoliths (e.g., a honeycomb structure, and the like), other porous structures (e.g., porous sponges), foams, pellets, particles, molecular sieves, and the like (depending upon the particular device), and combinations comprising at least one of the foregoing materials and forms, e.g., metallic foils, open pore aluminum oxide sponges, and porous ultra-low expansion glasses. A particularly preferred substrate includes a metal foil, such as stainless steel.

Although the substrate can have any size or geometry, the size and geometry are preferably chosen to optimize surface area in the given gas treatment device's design parameters. Typically, the substrate has a honeycomb geometry, with the combs being any multi-sided or rounded shape, with substantially square, triangular, pentagonal, hexagonal, heptagonal, or octagonal or similar geometries preferred due to ease of manufacturing and increased surface area. Additionally, the substrate may have varying cell densities, such as, greater than or equal to about 400 cells per square inch (cpsi), with greater than or equal to about 600 preferred, depending on the overall amount of the catalytic material that is to be used, and based on the desired efficiency of the catalyst. The cell density may range of about 200 cpsi to about 1,200 cpsi, with a preferred cell density of about 400 cpsi to about 600 cpsi for ceramic monoliths and about 600 to about 900 cpsi for metal monoliths. It is noted that all ranges disclosed herein are inclusive and combinable (e.g., ranges of less than or equal to about 25 mole percent (mol %), with about 5 mol % to about 20 mol % desired, and about 10 mol % to about 15 mol % more desired, includes the ranges of about 5 mol % to about 25 mol %, about 10 mol % to about 25 mol %, about 5 mol % to about 15 mol %, etc.)

In one embodiment, the catalyst comprises small particles and large particles (e.g., particles having an average major diameter of less than or equal to 1 micrometer) such that the large particles pack in a manner that forms voids around the large particles and the small particles (which are small enough to fill the void spaces created by the large particles, without disrupting the large particle packing) reside in the voids. In this method, the exhaust gasses transport through the porous large particles to reach the precious metal doped small particles. The gas phase materials poisonous to the precious metals (e.g., zinc, copper, phosphorus, etc., which are also poisonous to high surface area supports, are easily adsorbed by the reactive large particles. Only the gas phase materials that are not poisonous (e.g., NOx, HC's, and CO) are either not adsorbed onto the large particles or are adsorbed and easily released and pass through the large particles, reaching the precious metals contained on the small particles.

The small particles (i.e., the catalyst) comprise a precious metal and a precious metal support (e.g., ruthenium and/or iridium supported on zirconium oxide, titanium oxide and/or aluminum oxide). The catalyst may further comprise additional catalytic material(s) such as additional precious metals (e.g., platinum, palladium, rhodium, iridium, gold, and the like, and combinations comprising at least one of the foregoing precious metals). The catalytic material (e.g., precious metal(s) and additional precious metals) can be in the form of pure metal(s), oxide(s), sub-oxide(s), intermetallic(s), and the like, and combinations comprising at least one of the foregoing forms.

The precious metal support can comprise any material not soluble in the poison adsorbing material. The precious metal support preferably has an average primary particle size of less than or equal to about 20 nanometers (nm), and preferably less than or equal to about 10 nm. The precious metal support preferably is an agglomerated mass of primary particles. The agglomerated particles preferably have a major agglomerate diameter (i.e., measured along the major axis), of less than or equal to about 1.0 micrometer, with less than or equal to about 0.5 micrometers preferred, and less than or equal to about 0.3 micrometers particularly preferred. The precious metal support can include metal oxides and solid solutions of elements such as aluminum, zirconium, titanium, yttrium, lanthanum, cerium, and combinations comprising at least one of the foregoing, e.g., titanium-zirconium solid solution, cerium-zirconium solid solution, alpha aluminum oxide, and the like. Combinations comprising at least one of zirconium and titanium are particularly preferred. Preferentially, the precious metal support is milled or otherwise processed to break down aggregates to a major diameter of less than or equal to about 0.5 micrometers ($d_{50}$; i.e., greater than or equal to 50% of the agglomerates have a major diameter of less than or equal to about 0.5 micrometers).

The catalyst (e.g., catalyst portion) may further comprise stabilizing agent(s). Possible stabilizing agents include, barium, strontium, magnesium, lanthanum, cerium, praseodymium, yttrium, neodymium, and the like, as well as combinations of at least one of the foregoing stabilizing agents. Where the support material comprises aluminum oxide, particularly preferred stabilizing agents include barium, lanthanum, and combinations comprising at least one of barium and lanthanum, while where the precious metal support comprises zirconia, particularly preferred stabilizing agents include yttrium, cerium, and combinations comprising at least one of yttrium and cerium.

The catalyst may also comprise additional agents. These agents include, metals, phosphates, oxides, aluminides, hexaaluminates, and the like, and combinations comprising at least one of the foregoing. Suitable metals include, alkaline earth metals (e.g., barium, strontium, calcium, magnesium, and combinations comprising at least one of the foregoing, where barium and strontium are particularly preferred), transition metals (e.g., chrome, manganese, iron, cobalt, nickel, and combinations comprising at least one of the foregoing, where manganese and iron are particularly preferred), alkali metals (e.g., sodium, potassium, cesium, and combinations comprising at least one of the foregoing, where cesium is particularly preferred). Suitable metal phosphates can include aluminum phosphates, titanium phosphates, zirconium phosphates, tin phosphates, zinc phosphates, and the like, and combinations comprising at least one of the foregoing phosphates. Suitable oxides can include aluminum oxide, zirconium oxide, titanium oxide, and the like, and combinations comprising at least one of the foregoing oxides. Suitable hexaaluminates can include barium hexaaluminate, lanthanum hexaaluminate, manganese hexaaluminate, and the like, and combinations comprising at least one of the foregoing hexaaluminates. Stabilized hexaaluminates, the crystal stabilizers, may comprise barium ($BaAl_{12}O_{19}$), strontium ($SrAl_{12}O_{19}$) and magnesium ($MgAl_{12}O_{19}$). Rare earth stabilized hexaaluminates, the crystal stabilizers, may comprise lanthanum ($LaAl_{11}O_{18}$), praseodymium ($PrAl_{11}O_{18}$) and cerium ($CeAl_{11}O_{18}$). The combination of Group IIa and rare earths stabilizers particularly includes barium-lanthanum ($Ba_{0.5}La_{0.7}Al_{11}O_{18}$) and strontium-lanthanum ($Sr_{0.8}La_{0.2}Al_{11}O_{18}$). Suitable aluminides can be formed from aluminum in combination with metals including nickel, titanium, iron, niobium, platinum, cobalt, and the like, and combinations comprising at least one of the foregoing metals.

An exemplary system comprises a catalyst washcoat including ruthenium deposited upon titanium-zirconium solid solution preferably having milled agglomerates (measured along the major axis) of less than or equal to about 0.4 micrometers, with less than or equal to about 0.3 micrometers more preferred). The ruthenium-titanium-zirconium solid solution would preferably be mixed with barium-stabilized aluminum oxide having agglomerates preferably with a diameter (along the major axis) of greater than or equal to about 5.0 to about 10.0 micrometers, with greater than or equal to about 6.0 micrometers more preferred. In another embodiment, a catalyst washcoat can comprise ruthenium deposited upon cerium-zirconium solid solution mixed with barium-stabilized aluminum oxide. The agglomerates for these particles also preferably have similar diameters as set forth for the other exemplary washcoat.

The catalyst also preferably comprises a binder compatible with the metal oxides. The binder can be a metal acetate, such as aluminum acetate. For example, the catalyst can comprise about 2 wt % to about 10 wt % of metal oxide formed from the binder (e.g., aluminum oxide formed from aluminum acetate).

The large particles, (i.e., the poison adsorbing material) can comprise any material capable of adsorbing poisonous species from the exhaust stream. The poison adsorbing material, which has a large average particle size and a high surface area, can include metal oxides, aluminides, hexaaluminates, and combinations comprising at least one of the foregoing. The metal oxides can include oxides, such as, aluminum oxide, zirconium oxide, titanium oxide, and combinations comprising at least one of the foregoing oxides. Desirably, the metal oxide can comprise a combination of metal oxides, theta-aluminum oxide, gamma-aluminum oxide, and/or delta-aluminum oxide combined with alpha aluminum oxide ($\alpha$-$Al_2O_3$) as the small particles. The aluminides can include aluminum in combination with metals such as nickel, titanium, iron, niobium, platinum, cobalt, and the like, as well as combinations comprising at least one of the foregoing metals, wherein nickel, iron, titanium, and combinations comprising at least one of nickel, iron, and titanium are particularly preferred. The hexaaluminate can comprise a crystalline structure of aluminum and oxygen in combination with metals including barium, strontium, magnesium, lanthanum, cerium, praseodymium, neodymium, and the like, as well as alloys and combinations comprising at least one of the foregoing metals, wherein combinations comprising at least one of aluminum oxide and materials soluble in aluminum oxide are particularly preferred.

The poison adsorbing material(s) desirably has large particles such that the particles densely pack, leaving voids between these particles where the small particles will reside. The poison adsorbed material can have an average particle size, measured along the major axis (i.e., the longest axis), of greater than or equal to about 2.0 micrometers, with an average major diameter of about 5 micrometers to about 10 micrometers preferred.

The poison adsorbing materials may be stabilized with less than or equal to about 8.2 wt % of the stabilizing agent(s) (e.g., about 0.5 wt % to about 8.2 wt %), with about 1.1 wt % to about 5.6 wt % preferred, and about 2.2 wt % to about 4.2 wt % particularly preferred, based upon the total weight of the poison adsorbing material(s) and stabilizer.

Formation of the catalyst formulation (i.e., the catalyst and the poison adsorbing material) on the substrate can be accomplished in various fashions. The catalyst and the poison adsorbing material may be deposited onto the substrate by washcoating, imbibing, impregnating, physisorbing, chemisorbing, precipitating, or by other similar techniques. For example, the catalyst can be entrained in a solution, such that the active phase of the catalytic material may be solubilized, dissolved, suspended, emulsified, and/or dispersed in a solvent. For example, a slurry comprising the ruthenium and/or iridium, the precious metal support, and optionally binder(s), stabilizer(s), additional precious metal(s), additional agents, and a solvent can be formed.

Also included in the slurry for the formation of the catalyst composition, added concurrently with the metal oxide(s) and solvent, or after these components have been mixed, is an organic acid (e.g., acetate, citrate, oxylate, or the like). Also preferred is less than about 5 wt % nitrates in the slurry, based upon the total weight of solids in the slurry, with less than or equal to about 2 wt % nitrates more preferred, and no nitrates especially preferred (i.e., no nitrates were added; any presence is an impurity in one of the materials). For example, the slurry may optionally comprise at least some portion of one of the metals present in the slurry as an organic acid (e.g., aluminum acetate ($Al(C_2H_3O_2)(OH)_2$), zirconium acetate ($Zr(OH)_2(C_2H_3O_2)_2$), ammonium acetate ($NH_4(C_2H_3O_2)$), and the like, as well as combinations comprising one or more of the foregoing organic acids). The organic acid can be included in the slurry in an amount that, when the coating is calcined, the organic acid is converted to a metal or oxide forming about 0.5 wt % to about 15 wt % of the solids present in the calcined catalyst formulation, with about 1 wt % to about 10 wt % preferred, and about 2 wt % to about 5 wt % more preferred. For example, the slurry can comprise about 2 wt % to about 8 wt % zirconium oxide and up to about 5 wt % zirconium acetate, with about 3 wt % to about 6 wt % zirconium oxide and about 1 wt % to about 3 wt % zirconium acetate preferred.

Preferably, the slurry also comprises an optional reducing material such as amorphous carbon (e.g., carbon black, other carbonaceous material(s), and the like), polymers which will decompose to non-graphitic carbon, or other appropriate substitute. As used herein, a "reducing material" means a material that will reduce surface tension, enhancing the slurry dispersion and fluidity until the coating is heated to a desired point, thus reducing or eliminating slumping during drying, and reducing or eliminating cracks and pits.

The amount of catalyst used and the amount of optional components disposed onto the substrate depends on various parameters. Such parameters include, for example, the actual processing steps used in fabricating the formulated catalyst, as well as, the temperatures to which the slurry will be exposed upon formation, the ambient temperatures to which the calcined formulated catalyst will be exposed during operation, and the specific intended application thereof. The solids in the slurry may comprise about 2.0 wt % to about 34.0 wt % of the precious metal support, with about 4.0 wt % to about 20.0 wt % preferred, and about 6.0 wt % to about 16.0 wt % particularly preferred; based upon the total weight of solids in the slurry. The solids in the slurry may also comprise about 68.0 wt % to about 99.8 wt % of the poison adsorbing material, with about 76.0 wt % to about 86.0 wt % preferred, and about 79.0 wt % to about 83.0 wt % particularly preferred; based upon the total weight of solids in the slurry. Supported on the precious metal support is a catalyst material (ruthenium and/or iridium) in an amount of about 0.01 wt % to about 4.0 wt %, with about 0.2 wt % to about 2.0 wt % preferred, and about 0.8 wt % to about 1.4 wt % more preferred, based upon the total weight of solids in the slurry.

In addition to the ruthenium and/or iridium, the precious metal support(s), and the poison adsorbing material(s), the slurry may comprise: (i) less than or equal to about 7.0 wt % of the stabilizing agents (e.g., about 0.5 wt % to about 7.0 wt %), with about 1.0 wt % to about 5.0 wt % preferred, and about 2.0 wt % to about 4.0 wt % particularly preferred; and (ii) less than or equal to about 4.5 wt % of the additional metals (e.g., about 0.5 wt % to about 4.5 wt %), with about 1.0 wt % to about 3.0 wt % preferred, and about 1.5 wt % to about 2.5 wt % particularly preferred; based upon the total weight of solids in the slurry. Furthermore, the formulated catalyst may comprise: (i) less than or equal to about 6.0 wt % of metal oxide binder (e.g., about 0.5 wt % to about 6.0 wt %), with about 1.0 wt % to about 4.0 wt % preferred, and about 1.5 wt % to about 2.5 wt % particularly preferred, based upon the amount of metal or oxide formed from the binder in the calcined formulated catalyst; and (ii) about 1 wt % to about 15 wt % of the reducing agent, with about 0.5 wt % to about 10 wt % preferred, and about 1 wt % to about 5 wt % more preferred, base upon the total weight of solids of the slurry (excluding the reducing agent).

There are preferably no precious metals on the poison adsorbing material. The precious metal support may comprise greater than or equal to about 2.0 wt % ruthenium, with about 2.0 wt % to about 34 wt % preferred, and about 6.0 to about 18 wt % particularly preferred, based upon the total weight of the precious metal support and catalyst material, and additional catalyst material. The precious metal support may also comprise less than or equal to about 1.0 wt % additional catalytic material (e.g., precious metal), with about 0.1 wt % to about 0.75 wt % preferred, and about 0.25 wt % to about 0.5 wt % particularly preferred, based upon the total weight of the catalyst portion (e.g., precious metal support, stabilizer, binder, catalyst material, additional catalyst material, and precious metal material). The precious metals are present in amounts of less than or equal to about 100 grams per cubic foot ($g/ft^3$) of the substrate, e.g., about 5 $g/ft^3$ to about 100 $g/ft^3$, with about 10 $g/ft^3$ to about 75 $g/ft^3$ preferred, and about 15 $g/ft^3$ to about 35 $g/ft^3$ especially preferred.

The catalyst washcoat may comprise one, two, or several layers. For example, the first layer, deposited directly over the catalyst substrate, may contain poison adsorbing particles and ruthenium-precious metal support particles (wherein the particles are generally in the form of agglomerates). The poison adsorbing particles, about 3 to 10 micrometers in diameter, create void spaces. The ruthenium-precious metal support agglomerates, e.g., about 0.3 micrometers in diameter or less, fill the void spaces. A second layer, deposited over the first layer, may contain a large fraction of alkaline earth metal oxides and/or alkali metal oxides. The high alkaline earth content for preventing "glazing" from deposits of combusted engine oil additives, deposits of wear metals, and deposits from anti-freeze additives. Preferably, this coating comprise about 100 wt % alkaline earth oxide, with greater than or equal to about 50 wt % preferred, and greater than or equal to about 60 wt % especially preferred, based upon the total weight of solids in this coating.

Preferably, the pH of the slurry is controlled to attain and maintain a desired viscosity. The pH of the slurry is related to the viscosity of the slurry, such that, at higher pHs (e.g., 3.5 to 5.2), high solid loadings can be effectively used thereby reducing slumping and plugging of the washcoat in the monolith cells during drying and calcination. Consequently, a slurry pH of less than or equal to about 5.0 is preferably employed, with a pH of about 2.5 to about 4.8 preferred, with about 3.0 to about 4.5 more preferred, and about 3.8 to about 4.3 even more preferred. The pH can be adjusted by adding organic acid that does not adversely affect the metal oxide(s), binder, metals, and reducing material, e.g., ammonium acetate ($NH_4(C_2H_3O_2)$) to the slurry.

Once the pH has been adjusted, the catalyst slurry can be applied to at least a portion of the catalyst substrate. For example, the substrate can be dipped into the slurry, which is preferably stirred at a constant speed and then withdrawn from the slurry. The excess slurry remaining in the cells of the substrate can be cleared by vacuum or air, e.g., air knife. Alternatively, the coating can be applied to the substrate by a variety of techniques, including immersion, spraying, painting, and the like, e.g., spraying the slurry onto a metal foil substrate. The amount of coating deposited onto the substrate depends upon the physical and chemical properties of the slurry, such as viscosity and pH, as well as the withdrawal rate. For example, when a 600 cpsi cordierite ceramic monolith was dipped into slurry having a viscosity of 1,850 cps and a pH of 4.3, about 6.7 grams per cubic inch ($g/in^3$) to about 7.6 $g/in^3$ (wet pickup) of catalyst coating adhered to the substrate.

Following slurry coating, the coated substrate is dried and calcined at a temperature sufficient to burn off the reducing material, such as about 550° C. to about 800° C., with about 620° C. to about 650° C. preferred, for up to about 4 hours. During calcination, the oven ramp rate preferably does not exceed about 10° C./minute, with about 5° C./minute preferred, at temperatures below about 400° C., in order to produce crack-free coatings. The catalyst coating created was uniform and crack-free.

The desired thickness of the catalyst coating is based upon the ability to filter out poisoning elements while allowing passage of the exhaust gases to be catalyzed on the ruthenium and/or iridium. Although a multi-layered coating can be employed, the protective coating is preferably a single layer having an overall thickness of about 10 micrometers to about 130 micrometers, with about 30 micrometers to about 100 micrometers preferred.

An exemplary application of the catalyst is for use in a gas treatment device, wherein, the gas treatment device may comprise catalytic converters, evaporative emissions devices, scrubbing devices (e.g., hydrocarbon scrubbing devices, sulfur scrubbing devices), particulate traps/filters (e.g., diesel particulate filter/trap), and the like. In a particularly preferred embodiment, the catalyst is used in the close-coupled position or underfloor position in an exhaust system. In the close-coupled position, the converter inlet is greater than 10 cm to about 30 cm (generally less than 20 cm) from the engine exhaust port. In the underfloor position, the converter inlet is disposed about 40 cm to about 70 cm or so downstream of the exhaust manifold outlet. In contrast, with converters in the manifold position, the converter inlet is 0 cm to 10 cm from the engine exhaust port.

To incorporate the catalyst into a gas treatment device, the catalyst can be disposed within a shell. The catalyst can be formed integrally with the shell using a means for forming, such as, e.g., a spin forming method, or an end cone, end plate, exhaust manifold cover, and the like, can be concentrically fitted about one or both ends of the shell and secured thereto to provide a gas tight seal. The choice of material for the shell depends upon the type of exhaust gas, the maximum temperature reached by the catalyst/substrate subassembly, the maximum temperature of the exhaust gas stream, and the like. Suitable materials for the shell can comprise any material that is capable of resisting under-car salt, temperature and corrosion. Typically, ferrous materials are employed such as ferritic stainless steels. Ferritic stainless steels can include stainless steels such as, e.g., the 400-Series such as SS-409, SS-439, and SS-441, with grade SS-409 generally preferred.

Located in between the catalyst and the shell can be a retention material that insulates the shell from both the high exhaust gas temperatures and the exothermic catalytic reaction occurring within the catalyst. The retention material, which enhances the structural integrity of the catalyst by applying compressive radial forces about it, reducing its axial movement, and retaining it in place, is concentrically disposed around the catalyst to form a retention material/catalyst subassembly. The retention material, which is typically in the form of a mat, particulates, or the like, can be any material capable of insulating the catalyst and preferably capable of holding the catalyst in the desired location while being inserted into a shell. The retention material can be a formed fibrous material containing vermiculite, refractory ceramic fibers, organic binders, and other materials, as well as combinations comprising at least one of the foregoing materials. The retention material can either be a simple non-expanding ceramic material, or an intumescent material, e.g., one which contains a vermiculite component that expands with heating to maintain firm compression when the outer steel expands outward from the catalyst substrate, as well as material which include a combination of both.

The above catalyst system can be used in various devices and in variously designed an exhaust systems. For example, it can be used in a close-coupled or a manifold gas treatment device with a particulate filter, NOx adsorber, NOx catalyst, oxidation catalyst, three-way catalyst, and/or sulfur trap located downstream and in fluid communication therewith. Additionally, the down stream devices can be arranged in any order in fluid communication with one another, in series and/or in parallel.

EXAMPLES

Example 1

A mixture was made using 104.0 grams ruthenium nitrosylnitrate solution (15.0 wt % ruthenium) and 469.5 grams zirconium citrate (18.0 wt % zirconium oxide solids when calcined) and 1,600 grams water. The mixture was microwaved to dryness while vigorously stirring. The dry powder was microwaved to decomposition. The decomposed powders were calcined at about 650° C. The proportion of the ruthenium dioxide was about 15.5 wt % and the proportion of the zirconium dioxide was about 84.5 wt %. The average particle size of the ruthenium-zirconium oxide was about 0.22 micrometers. The calcined ruthenium-zirconium powder was post impregnated with a palladium sulfate and vanadium sulfate solution and calcined to 650° C. The resulting calcined ruthenium-zirconium oxide precious metal support contained 0.09 wt % palladium and 0.09 wt % vanadium.

A 600 cpsi cordierite monolith was coated with 7.5 grams per cubic inch (g/in$^3$) slurry, containing 52 wt % solids, the solids consisting of about 79.0 wt % barium stabilized gamma-delta aluminum oxide (3.0 wt % barium) having an average particle size of about 4.0 micrometers, and 18.0 wt % ruthenium-zirconium oxide with palladium-vanadium oxide doping having an average particle size of about 0.22 micrometers. The slurry also contained 4 wt % zirconium acetate in solution and 6 wt % aluminum nitrate in solution that deposited about 2 wt % zirconium oxide and 3.0 wt % aluminum oxide solid, as a component of the calcined washcoat. The washcoated monolith was calcined for 4 hours at about 650° C. The finished monolith had a washcoat loading of 3.98 g/in$^3$. The washcoat comprised 3.08 g/in$^3$ barium stabilized gamma-delta aluminum oxide (3.0 wt % barium, particle size average 4.0 micrometers), 0.08 g/in$^3$ zirconium oxide, 0.12 g/in$^3$ aluminum oxide and 0.70 g/in$^3$ ruthenium-zirconium solid solution (particle size average 0.22 micrometers), with 193 g/ft$^3$ ruthenium, 35 g/ft$^3$ palladium and 35 g/ft$^3$ vanadium deposited over the zirconium oxide.

Example 2

A 600 cpsi cordierite monolith was coated with 7.4 g/in$^3$ slurry, containing 52 wt % solids, the solids comprised about 79.0 wt % barium stabilized gamma-delta aluminum oxide (3.0 wt % barium) having an average particle size of about 6.4 micrometers and 18.0 wt % zirconium oxide having an average particle size of about 0.30 micrometers. The slurry also contained 4 wt % zirconium acetate in solution and 6 wt % aluminum nitrate in solution that deposited about 2 wt % zirconium oxide and 3.0 wt % aluminum oxide solid, as a component of the calcined washcoat. The washcoated monolith was calcined for 4 hours at about 500° C. The calcined washcoat was post-impregnated with a 3.16 wt % ruthenium nitrosylnitrate solution, microwave dried and calcined at 650° C. The finished monolith had a washcoat loading of 3.96 g/in$^3$, comprising 3.05 g/in$^3$ barium stabilized gamma-delta aluminum oxide (3.0 wt % barium, particle size average 4.0 micrometers), 0.69 g/in$^3$ zirconium oxide (particle size average 0.28 micrometers), 0.08 g/in$^3$ zirconium oxide form zirconium acetate and 0.12 g/in$^3$ aluminum oxide. The finished monolith had a precious metal loading of 193 g/ft$^3$ ruthenium deposited over all oxides.

Example 3

A mixture was made using 104.0 grams ruthenium nitrosylnitrate solution (15.0 wt % ruthenium) and 469.5 grams zirconium citrate (18.0 wt % zirconium oxide solids when calcined) and 1,600 grams water. The mixture was microwaved to dryness while vigorously stirring. The dry powder was microwaved to decomposition. The decomposed powders were calcined at about 650° C. The proportion of the ruthenium dioxide was about 15.5 wt % and the proportion of the zirconium dioxide was about 84.5 wt %. The average particle size of the ruthenium-zirconium oxide was about 0.22 micrometers.

A 600 cpsi cordierite monolith was coated with 7.5 grams per cubic inch (g/in$^3$) slurry, containing 52 wt % solids, the solids comprising about 79.0 wt % barium stabilized gamma-delta aluminum oxide (3.0 wt % barium) having an average particle size of about 4.0 micrometers, and 18.0 wt % ruthenium-zirconium oxide with palladium-vanadium oxide doping having an average particle size of about 0.22 micrometers. The slurry also contained 4 wt % zirconium acetate in solution and 6 wt % aluminum nitrate in solution that deposited about 2 wt % zirconium oxide and 3.0 wt % aluminum oxide solid, as a component of the calcined washcoat. The washcoated monolith was calcined for 4 hours at about 650° C. The finished monolith had a washcoat loading of 3.98 g/in$^3$, comprising 3.08 g/in$^3$ barium stabilized gamma-delta aluminum oxide (3.0 wt % barium, particle size average of 4.0 micrometers), 0.08 g/in$^3$ zirconium oxide from zirconium acetate, 0.12 g/in$^3$ aluminum oxide and about 0.74 g/in$^3$ ruthenium-zirconium solid solution (particle size average of 0.22 micrometers) with 193 g/ft$^3$ ruthenium deposited over the zirconium oxide.

Example 4

A mixture was made using 104.0 grams ruthenium nitrosylnitrate solution (15.0 wt % ruthenium) and 469.5 grams zirconium citrate (18.0 wt % zirconium oxide solids when calcined) and 1,600 grams water. The mixture was microwaved to dryness while vigorously stirring. The dry powder was microwaved to decomposition. The decomposed powders were calcined at about 650° C. The proportion of the ruthenium dioxide was about 15.5 wt % and the proportion of the zirconium dioxide was about 84.5 wt %. The average particle size of the ruthenium-zirconium oxide was about 0.22 micrometers. The calcined ruthenium-zirconium powder was post impregnated with a palladium sulfate and vanadium sulfate solution and calcined to 650° C. The resulting calcined ruthenium-zirconium oxide contained 0.09 wt % palladium and 0.09 wt % vanadium.

A 600 cpsi cordierite monolith was coated with 7.6 grams per cubic inch (g/in$^3$) slurry, containing 52 wt % solids, the solids consisting of about 79.0 wt % barium hexaaluminate having an average particle size of about 4.0 micrometers, and 18.0 wt % ruthenium-zirconium oxide with palladium-vanadium oxide doping having an average particle size of about 0.22 micrometers. The slurry also contained 4 wt % zirconium acetate in solution and 6 wt % aluminum nitrate in solution that deposited about 2 wt % zirconium oxide and 3.0 wt % aluminum oxide solid, as a component of the calcined washcoat. The washcoated monolith was calcined for 4 hours at about 650° C. The finished monolith had a washcoat loading of 4.00 g/in$^3$, comprising 3.08 g/in$^3$ barium hexaaluminate (particle size average of 6.4 micrometers), 0.08 g/in$^3$ zirconium oxide from zirconium acetate, 0.12 g/in$^3$ aluminum oxide and about 0.72 g/in$^3$ ruthenium-zirconium solid solution (particle size average of 0.22 micrometers) with 193 g/ft$^3$ ruthenium, 35 g/ft$^3$ palladium and 35 g/ft$^3$ vanadium deposited over the zirconium oxide.

Example 5

A mixture was made using 104.0 grams ruthenium nitrosylnitrate solution (15.0 wt % ruthenium) and 469.5 grams zirconium citrate (18.0 wt % zirconium oxide solids when calcined) and 1,600 grams water. The mixture was microwaved to dryness while vigorously stirring. The dry powder was microwaved to decomposition. The decomposed powders were calcined at about 650° C. The proportion of the ruthenium dioxide was about 15.5 wt % and the proportion of the zirconium dioxide was about 84.5 wt %. The average particle size of the ruthenium-zirconium oxide was about 0.22 micrometers. The calcined ruthenium-zirconium powder was post impregnated with a palladium sulfate and vanadium sulfate solution and calcined to 650° C. The resulting calcined ruthenium-zirconium oxide contained 0.09 wt % palladium and 0.09 wt % vanadium.

A 600 cpsi cordierite monolith was coated with 7.4 grams per cubic inch (g/in$^3$) slurry, containing 52 wt % solids, the solids consisting of about 79.0 wt % barium stabilized gamma-delta aluminum oxide (3.0 wt % barium) having an average particle size of about 4.0 micrometers, and 18.0 wt % ruthenium-zirconium oxide with palladium-vanadium oxide doping having an average particle size of about 0.22 micrometers. The slurry also contained 4 wt % zirconium acetate in solution and 6 wt % aluminum nitrate in solution that deposited about 2 wt % zirconium oxide and 3.0 wt % aluminum oxide solid, as a component of the calcined washcoat. The washcoated monolith was calcined for 4 hours at about 650° C. The calcined monolith had a first layer of 3.96 g/in$^3$, comprising 3.06 g/in$^3$ barium stabilized gamma-delta aluminum oxide (3.0 wt % barium, particle size average of 4.0 micrometers), 0.08 g/in$^3$ zirconium oxide from zirconium acetate, 0.12 g/in$^3$ aluminum oxide and about 0.70 g/in$^3$ ruthenium-zirconium solid solution (particle size average of 0.22 micrometers) with 193 g/ft$^3$ ruthenium, 35 g/ft$^3$ palladium and 35 g/ft$^3$ vanadium deposited over the zirconium oxide.

The calcined washcoat was coated with 0.28 g/in$^3$ slurry containing 46 wt % solids comprising 40 wt % barium oxide and 60 wt % strontium oxide. The coated monolith was calcined for 30 minutes at 650° C. The calcined monolith had a second washcoat layer of about 0.16 g/in$^3$ barium oxide and 0.12 g/in$^3$ strontium oxide.

The catalyst comprising ruthenium as the catalytic material has several advantages over traditional catalysts. First, ruthenium can combust about 20% more of the noxious pollutants than can other active phases typically used, such as nickel or manganese. The fact that ruthenium has less oxidizing activity than does, for example, palladium and rhodium, is actually beneficial in the overall capabilities of the active phase. By being less efficient in the oxidation of hydrocarbons and carbon monoxide, there is still enough hydrocarbons left over to oxidize the $NO_X$ downstream. Therefore, by being able to oxidize both the hydrocarbons and the nitrogen oxide, ruthenium proves to be a more efficient catalyst than traditionally used catalytic materials, such as palladium, rhodium, manganese, or nickel.

Another advantage to using ruthenium as the active phase of the catalyst, particularly in close-coupled catalytic converters, relates to the cost factor. Platinum is about 10 times more expensive, palladium is about 3 times more expensive, and rhodium is about 5 times more expensive than ruthenium. Ruthenium can be used to make a solid solution with zirconium, without exceeding the cost of platinum, palladium, platinum-rhodium, and palladium-rhodium type catalysts.

Post impregnated catalysts deposit precious metal over all the materials in the formulation. The precious metal deposited on certain materials such as barium oxide, are wasted because of low catalyst activity on those materials. Deposition on a desired oxide, e.g., aluminum oxide, before mixing a slurry means higher concentration loadings are necessary, because higher concentration of ruthenium allow catalyzed slurry to be used is an overall more efficient close-coupled converter, less ruthenium would be required than would palladium and rhodium; the sum result being, that ruthenium is a more cost-effective catalytic material than is platinum, palladium, or rhodium.

Current problems also exist with regard to the slight attraction that typical supports exhibit towards precious metals. Due to the minimal chemical attraction, the precious metals migrate across the supports, forming agglomerated particles. Alkaline and alkaline earth oxides, such as barium oxide, accelerate the migration of precious metals. This migration is most significant at temperatures in excess of about 1,000° C. Catalytic activity is dependent on the surface area of the catalytic material. Formation of these agglomerated particles decreases catalytic activity. Formation of solid solutions of ruthenium-zirconium is a method of inhibiting migration of ruthenium into large agglomerated particles. Formation of other precious metal solid solutions such as palladium-zirconium is not practical due to amount of and cost of the palladium metal. Further, palladium oxides formed at low temperatures, e.g., 400° C. are decomposed to palladium metal at higher temperatures, e.g., 800° C. A solution of palladium-zirconium oxide would separate to palladium and zirconium oxide at higher temperatures, e.g., 800° C. Ruthenium oxides can withstand temperatures up to about 1,050° C.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A catalyst formulation, comprising:
   a poison adsorbing material comprising large particles having an average major diameter of greater than or equal to about 2.0 micrometers; and
   a catalyst portion comprising a precious metal support comprising small particles having an average major diameter of less than or equal to about 1.0 micrometers, and a catalyst material comprising at least one of ruthenium and iridium, wherein the precious metal support comprises a solid solution comprising titanium and zirconium.

2. The catalyst formulation of claim 1, wherein the small particle average major diameter is less than or equal to about 0.5 micrometers.

3. The catalyst formulation of claim 2, wherein the small particle average major diameter is less than or equal to about 0.3 micrometers.

4. The catalyst formulation of claim 1, wherein the large particle average major diameter is 5 micrometers to about 10 micrometers.

5. The catalyst formulation of claim 1, comprising about 2.0 wt % to about 34.0 wt % of the precious metal support, about 0.01 wt % to about 4.0 wt % of the catalyst material, and about 68.0 wt % to about 99.8 wt % of the poison adsorbing material; based on the total weight of solids in the catalyst formulation.

6. The catalyst formulation of claim 5, comprising about 4.0 wt % to about 20.0 wt % of the precious metal support, about 0.2 wt % to about 2.0 wt % of the catalyst material, and about 76.0 wt % to about 86.0 wt % of the poison adsorbing material.

7. The catalyst formulation of claim 6, comprising about 6.0 wt % to about 16.0 wt % of the precious metal support, about 0.8 wt % to about 1.4 wt % of the catalyst material, and about 79.0 wt % to about 83.0 wt % of the poison adsorbing material.

8. The catalyst formulation of claim 5, further comprising about 0.01 wt % to about 0.6 wt % of a precious metal material; about 0.5 wt % to about 7.0 wt % of a stabilizing agent; about 0.5 wt % to about 4.5 wt % additional metal; based on the total weight of solids in the catalyst formulation.

9. The catalyst formulation of claim 5, further comprising about 0.5 wt % to about 6.0 wt % metal oxide binder, based Upon an amount of metal or oxide formed from the metal oxide binder when the catalyst formulation is calcined.

10. The catalyst formulation of claim 5, further comprising about 1 wt % to about 15 wt % of the reducing agent, base upon the total weight of solids of in the catalyst formulation, excluding the reducing agent.

11. The catalyst formulation of claim 1, comprising about 2.0 wt % to about 34 wt % ruthenium, based upon the total weight of the catalyst portion.

12. The catalyst formulation of claim 11, wherein the catalyst portion further comprises about 0.1 wt % to about 1.0 wt % precious metal material, based upon the total weight of the catalyst portion.

13. The catalyst formulation of claim 1, wherein the precious metal support further comprises at least one of zirconium oxide, titanium oxide, and aluminum oxide.

14. The catalyst formulation of claim 1, wherein the precious metal support further comprises a solid solution of elements selected from the group consisting of aluminum, zirconium, titanium, yttrium, lanthanum, cerium, and combinations comprising at least one of the foregoing elements.

15. The catalyst formulation of claim 1, wherein at least one of the poison adsorbing material and the catalyst material further comprises a stabilizing agent selected from the group consisting of barium, strontium, magnesium, lanthanum, cerium, praseodymium, yttrium, neodymium, and combinations of at least one of the foregoing stabilizing agents.

16. The catalyst formulation of claim 1, further comprising a metal acetate.

17. The catalyst formulation of claim 1, wherein the poison adsorbing material further comprises at least one of an aluminide and a hexaaluminate.

18. The catalyst formulation of claim 1, further comprising a pH of about 2.5 to about 5.0.

19. The catalyst formulation of claim 18, further comprising an organic acid.

20. The catalyst formulation of claim 1, wherein the poison adsorbing material comprises barium-stabilized aluminum oxide, and wherein the catalyst material comprises ruthenium.

21. The catalyst formulation of claim 1, wherein the solid solution has an agglomerate diameter, measured along a major axis, of less than or equal to about 0.4 micrometers, and wherein the barium-stabilized aluminum oxide has an agglomerate diameter, measured along a major axis, of greater than or equal to about 5.0 micrometers.

22. The catalyst formulation of claim 21, wherein the solid solution agglomerate diameter is less than or equal to about 0.3 micrometers, and wherein the barium-stabilized aluminum oxide agglomerate diameter is greater than or equal to about 6.0 micrometers.

23. The catalyst formulation of claim 1, wherein no precious metals were added to the poison adsorbing portion, and wherein the catalyst material and any precious metals were added to the catalyst portion prior to the catalyst portion being combined with the poison adsorbing material.

24. The catalyst formulation of claim 1, wherein no nitrates are present.

25. The catalyst formulation of claim 1, wherein the catalyst portion further comprises an agent selected from the group consisting of chrome, manganese, iron, cobalt, nickel, and combinations comprising at least one of the foregoing agents.

26. The catalyst formulation of claim 1, wherein the catalyst portion further comprises a metal phosphate selected from the group consisting of aluminum phosphates, titanium phosphates, zirconium phosphates, tin phosphates, zinc phosphates, and combinations comprising at least one of the foregoing phosphates.

27. The catalyst formulation of claim 1, wherein the catalyst portion further comprises a hexaaluminate selected form the group consisting of barium hexaaluminate, lanthanum hexaaluminate, manganese hexaaluminate, and combinations comprising at least one of the foregoing hexaaluminates.

28. The catalyst formulation of claim 27, wherein the hexaaluminate comprises a crystal stabilizer selected from the group consisting of barium, strontium, magnesium, lanthanum, praseodymium, cerium, and combinations comprising at least one of the foregoing crystal stabilizers.

29. A gas treatment device comprising:
a shell;
a coated substrate disposed within the shell, wherein the initial coating comprises a calcined product of
a poison adsorbing material comprising large particles having an average major diameter of greater than or equal to about 2.0 micrometers; and
a catalyst material comprising a precious metal support comprising small particles having an average major diameter of less than or equal to about 1.0 micrometers, and a catalyst material comprising at least one of ruthenium and iridium; and
a retention material disposed between the shell and the substrate.

30. The gas treatment device of claim 29, wherein the substrate further comprises a metal foil.

31. The gas treatment device of claim 29, further comprising an additional coating disposed over the initial coating, wherein the additional coating comprises at least one of an alkaline earth oxide and an alkali metal oxide.

32. An exhaust system, comprising:
a gas treatment device located in a close-coupled or a manifold position, the gas treatment device comprising
a shell;
a coated substrate disposed within the shell, wherein the coating comprises a calcined product of
a poison adsorbing material comprising large particles having an average major diameter of greater than or equal to about 2.0 micrometers; and
a catalyst material comprising a precious metal support comprising small particles having an average major diameter of less than or equal to about 1.0 micrometers, and a catalyst material comprising at least one of ruthenium and iridium; and
a retention material disposed between the shell and the substrate.

33. The exhaust system of claim 32, further comprising a particulate filter disposed downstream and in fluid communication with the gas treatment device.

34. The exhaust system of claim 33, further comprising an oxidation catalyst disposed downstream and in fluid communication with the gas treatment device.

35. The exhaust system of claim 33, further comprising at least one of a NOx adsorber and a NOx, catalyst disposed downstream and in fluid communication with the gas treatment device.

36. A catalyst formulation, comprising:
a poison adsorbing material comprising large particles having an average major diameter of greater than or equal to about 2.0 micrometers;
a catalyst portion comprising a precious metal support comprising small particles having an average major diameter of less than or equal to about 1.0 micrometers, and a catalyst material comprising at least one of ruthenium and iridium,
and further comprising a metal acetate.

37. A catalyst formulation, comprising:
a poison adsorbing material comprising large particles having an average major diameter of greater than or equal to about 2.0 micrometers;
a catalyst portion comprising a precious metal support comprising small particles having an average major diameter of less than or equal to about 1.0 micrometers, and a catalyst material comprising at least one of ruthenium and iridium,
said catalyst formulation further comprising an organic acid.

\* \* \* \* \*